(12) United States Patent
Zhu

(10) Patent No.: US 10,956,025 B2
(45) Date of Patent: Mar. 23, 2021

(54) GESTURE CONTROL METHOD, GESTURE CONTROL DEVICE AND GESTURE CONTROL SYSTEM

(71) Applicant: TENCENT TECHNOLOGY (SHENZHEN) COMPANY LIMITED, Guangdong (CN)

(72) Inventor: Zhenhua Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 65 days.

(21) Appl. No.: 15/696,467

(22) Filed: Sep. 6, 2017

(65) Prior Publication Data

US 2017/0364257 A1    Dec. 21, 2017

Related U.S. Application Data

(63) Continuation of application No. PCT/CN2016/079220, filed on Apr. 14, 2016.

(30) Foreign Application Priority Data

Jun. 10, 2015    (CN) .......................... 2015 1 0316890

(51) Int. Cl.
*G06F 3/0488* (2013.01)
*G08C 17/02* (2006.01)
(Continued)

(52) U.S. Cl.
CPC ........ *G06F 3/04883* (2013.01); *G06F 3/0488* (2013.01); *G06F 3/147* (2013.01);
(Continued)

(58) Field of Classification Search
CPC .... G06F 3/0488; G06F 3/04883; G06F 3/147; H04N 21/42204; H04N 21/4222
See application file for complete search history.

(56) References Cited

U.S. PATENT DOCUMENTS

| 2009/0052785 A1 | 2/2009 | Shamaie |
| 2010/0245680 A1 | 9/2010 | Tsukada et al. |

(Continued)

FOREIGN PATENT DOCUMENTS

| CN | 102883066 A | 1/2013 |
| CN | 102981748 A | 3/2013 |

(Continued)

OTHER PUBLICATIONS

W. Fenlon, "How the Wii U Works," published Dec. 12, 2012 as indicated on p. 12, downloaded from https://electronics.howstuffworks.com/wii-u2.htm (Year: 2012).*

(Continued)

*Primary Examiner* — Eric J Yoon
(74) *Attorney, Agent, or Firm* — Anova Law Group, PLLC

(57) ABSTRACT

Provided are a gesture control method, a gesture control device and a gesture control system. The gesture control method includes: establishing, by a mobile terminal, a wireless communication connection with a display device; displaying, by the mobile terminal, a gesture input interface corresponding to a current application of the display device; detecting, by the mobile terminal, a user gesture; converting, by the mobile terminal, the user gesture into an operation instruction corresponding to the user gesture; and transmitting, by the mobile terminal, the operation instruction to the display device.

14 Claims, 6 Drawing Sheets

(51) Int. Cl.
*G06F 3/147* (2006.01)
*H04M 1/725* (2006.01)
*H04W 76/10* (2018.01)

(52) U.S. Cl.
CPC ........ *G08C 17/02* (2013.01); *H04M 1/72519* (2013.01); *G06F 2203/0383* (2013.01); *G08C 2201/32* (2013.01); *H04M 1/72533* (2013.01); *H04M 2250/22* (2013.01); *H04W 76/10* (2018.02)

(56) References Cited

U.S. PATENT DOCUMENTS

| | | | |
|---|---|---|---|
| 2011/0191516 A1* | 8/2011 | Xiong | G06F 3/041 710/305 |
| 2011/0267291 A1 | 11/2011 | Choi et al. | |
| 2012/0146918 A1* | 6/2012 | Kreiner | H04M 1/7253 345/173 |
| 2012/0313869 A1 | 12/2012 | Konami | |
| 2013/0154958 A1* | 6/2013 | Clavin | A63F 13/24 345/173 |
| 2013/0159939 A1 | 6/2013 | Krishnamurthi | |
| 2013/0169574 A1 | 7/2013 | Suh et al. | |
| 2013/0211843 A1 | 8/2013 | Clarkson | |
| 2014/0040831 A1 | 2/2014 | Akasaka et al. | |
| 2014/0049467 A1* | 2/2014 | Laligand | H04N 5/4403 345/157 |
| 2014/0184510 A1 | 7/2014 | Jeong et al. | |
| 2014/0189523 A1* | 7/2014 | Shuttleworth | G06F 3/0484 715/741 |
| 2014/0340323 A1 | 11/2014 | Jang | |
| 2015/0305551 A1* | 10/2015 | Rosati | A47J 27/21008 426/231 |
| 2015/0382066 A1* | 12/2015 | Heeter | H04N 21/47217 386/234 |

FOREIGN PATENT DOCUMENTS

| | | |
|---|---|---|
| CN | 102981758 A | 3/2013 |
| CN | 103529778 A | 1/2014 |
| CN | 103634641 A | 3/2014 |
| CN | 104866110 A | 8/2015 |
| JP | 2010-239251 A | 10/2010 |
| JP | 2012-231249 A | 11/2012 |
| JP | 2013-141242 A | 7/2013 |
| JP | 2013-232208 A | 11/2013 |
| JP | 2014-132456 A | 7/2014 |
| JP | 2014-137671 A | 7/2014 |
| JP | 2014-535100 A | 12/2014 |
| JP | 2015-510197 A | 4/2015 |
| KR | 10-2014-0088446 A | 7/2014 |
| KR | 10-2014-0134453 A | 11/2014 |
| WO | WO 2009/026337 A1 | 2/2009 |
| WO | WO 2012/118056 A1 | 9/2012 |
| WO | WO 2013/055953 A1 | 4/2013 |
| WO | WO 2013/123077 A1 | 8/2013 |

OTHER PUBLICATIONS

YouTube video by Xbox, Kinect Tips, Part 3: Gesture Controls, published May 7, 2014, downloaded from https://www.youtube.com/watch?v=VXhhE-I96qQ (Year: 2014).*
Nielsen Norman Group, "Smartwatches are the Future," R. Budiu, published Dec. 8, 2013, downloaded at https://www.nngroup.com/articles/samsung-watch/ (Year: 2013).*
S. Hampton, "Chess Builds Better Brains: 18 of the Best iOS Chess Apps to Improve Your Game (and Your Mind)," dated Mar. 31, 2013, downloaded at https://seanhamptoncole.wordpress.com/2013/03/31/chess-builds-better-brains-18-of-the-best-ios-chess-apps-to-innprove-your-game-and-your-mind/ (Year: 2013).*
Decision of Rejection with Translation for Japanese Patent Application No. 2017-525966 dated Nov. 5, 2018, in 5 pages.
Office Action with Translation Issued for Japanese Application No. 2017-525966 dated Jul. 2, 2018.
Office Action with Translation Issued for Korean Application No. 10-2017-7026544 dated Sep. 13, 2018.
International Search Report with Translation for International Application No. PCT/CN2016/079220 dated Jul. 15, 2016, 13 pages.

* cited by examiner

Swipe down

2×Swipe down
(Two figure swipe down)

GESTURE CONTROL METHOD, GESTURE CONTROL DEVICE AND GESTURE CONTROL SYSTEM

This application is a continuation of International Patent Application No. PCT/CN2016/079220, filed on Apr. 14, 2016, which claims priority to Chinese Patent Application No. 201510316890.1, titled "GESTURE CONTROL METHOD, MOBILE TERMINAL AND SYSTEM", filed on Jun. 10, 2015 with the State Intellectual Property Office of the People's Republic of China, both of which are incorporated herein by reference in their entireties.

TECHNICAL FIELD

The present disclosure relates to the field of communications technology, and in particular to a gesture control method, a gesture control device and a gesture control system.

BACKGROUND

At present, after an application software is run in a display device such as a television, operations such as menu selection, game operation input are needed to be performed to the application software.

In the current market, a generally used operation input manner for the application software is using a remote-controller. The remote-controller includes multiple input buttons, such as a confirmation button, an up/down/left/right movement button, a mode selection button. A user controls the movement position of a cursor by using the input buttons, and then operates the input button to perform a confirmation operation. For televisions with a few functions such as channel mode selection, volume control, this input manner using remote-controller may meet the demand. However, with more and more operation instructions for the application software, the manner of inputting instructions through the remote-controller is not convenient, and results in low efficiency.

In order to improve the efficiency of inputting the operation instructions to the television, a gesture input manner is developed currently. For example, a camera and a processor and so on are integrated in the television. The television detects a user gesture of a user standing in front of the television, recognizes the user gesture, and determines an operation instruction corresponding to the user gesture, and then executes the operation instruction to display an operation result. However, with the solution of realizing the gesture input for the television, the cost of the television is greatly increased, and the user needs to operate in front of the television, which does not meet operation habits of the user. Therefore, the solution of realizing the gesture input for the television has technical issues of high cost and inconvenient inputting of gesture instruction.

SUMMARY

Provided are a gesture control method, a gesture control device and a gesture control system according to embodiments of the present disclosure, which enables convenient inputting of instructions.

A gesture control method is provided according to an embodiment of the present disclosure. The gesture control method includes:

establishing, by a mobile terminal, a wireless communication connection with a display device;

displaying, by the mobile terminal, a gesture input interface corresponding to a current application of the display device;

detecting, by the mobile terminal, a user gesture;

converting, by the mobile terminal, the user gesture into an operation instruction corresponding to the user gesture; and transmitting, by the mobile terminal, the operation instruction to the display device.

A gesture control device is provided according to an embodiment of the present disclosure. The gesture control device includes:

a connection maintenance unit, configured to establish a wireless communication connection with a display device;

a display unit, configured to display a gesture input interface corresponding to a current application of the display device;

a gesture detection unit, configured to detect a user gesture;

an instruction conversion unit, configured to convert the user gesture into an operation instruction corresponding to the user gesture; and an instruction transmission unit, configured to transmit the operation instruction to the display device.

A gesture control system is provided according to an embodiment of the present disclosure, the gesture control system includes the gesture control device according to an embodiment of the present disclosure and a display device.

A gesture control device is provided according to an embodiment of the present disclosure. The gesture control device includes:

at least one processor; and a memory, configured to store program instructions that configure the gesture control device to perform the gesture control method according to an embodiment of the disclosure when executed by the processor.

It is provided according to an embodiment of the disclosure a non-transitory computer readable storage medium including program instructions that configure a computing device to perform the gesture control method according to the embodiment of the disclosure when executed by a processor of the computing device.

As can be seen from the above technical solutions, embodiments according to the present disclosure have at least the following advantages. The user gesture is detected and converted into a corresponding operation instruction by the mobile terminal having a gesture input function, then the operation instruction is transmitted to the display device through the wireless communication connection between the mobile terminal and the display device, and the display device operates based on the instruction. In this process, the display device does not need to have gesture detection capability, and the gesture detection capability is achieved by taking full advantage of the capabilities of existing device, and the user can hold the mobile terminal for inputting instead of standing in front of the display device, so that the hardware cost is relatively low and the inputting of gesture instruction is convenient.

BRIEF DESCRIPTION OF THE DRAWINGS

In order to illustrate technical solutions in embodiments of the present disclosure more clearly, drawings used in the description of the embodiments are introduced briefly hereinafter. The drawings described hereinafter illustrate some embodiments of the present disclosure, and other drawings may be obtained by those skilled in the art based on these drawings and fall within the present disclosure.

DETAILED DESCRIPTION OF THE EMBODIMENTS

To make the object, technical solutions and advantages of the present disclosure clearer, the present disclosure is further described in detail in conjunction with drawings. The embodiments described herein are some embodiments of the present disclosure. Other embodiments which may be obtained by those skilled in the art and fall into the protection scope of the present disclosure.

Figure 1:
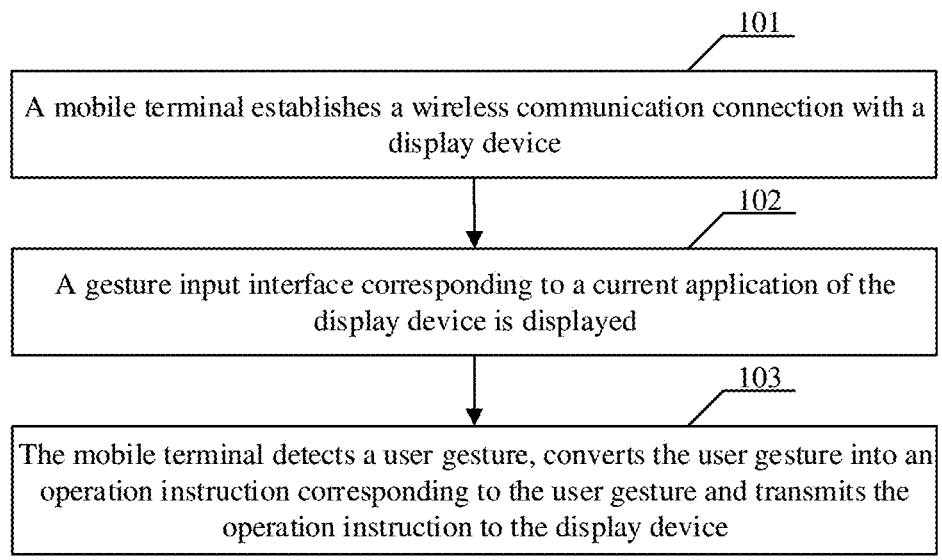
FIG. 1 is a schematic flowchart of a gesture control method according to an embodiment of the present disclosure.
Figure 2A:
FIG. 2A is a schematic diagram of a gesture according to an embodiment of the present disclosure.
Figure 2B:
FIG. 2B is a schematic diagram of a gesture according to an embodiment of the present disclosure.
Figure 2C:
FIG. 2C is a schematic diagram of a gesture according to an embodiment of the present disclosure.
Figure 2D:
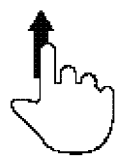
FIG. 2D is a schematic diagram of a gesture according to an embodiment of the present disclosure.
Figure 2E:
FIG. 2E is a schematic diagram of a gesture according to an embodiment of the present disclosure.
Figure 2F:
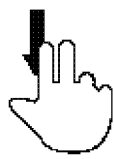
FIG. 2F is a schematic diagram of a gesture according to an embodiment of the present disclosure.

As shown in FIG. 1, a gesture control method is provided according to an embodiment of the present disclosure, which includes the following steps 101 to 103.

In step 101, a mobile terminal establishes a wireless communication connection with a display device.

The mobile terminal may have a gesture input function. The mobile terminal may have corresponding hardware and/or software depending on a gesture input manner supported by the mobile terminal. The gesture input manner may be a touch gesture, or a floating gesture. For example, grammatical information of the gesture may be passed through a configuration and a movement change of a hand.

Based on the mobile communication capability of the mobile terminal, the mobile terminal may establish a connection with the display device using different communication manners, such as wireless local area network, point to point connection technology, more specifically, Bluetooth, wireless fidelity (WIFI). The communication manner may be selected based on the wireless communication capability of the mobile terminal and the display device.

Based on the communication advantages of WIFI and a situation that most families use WIFI as the wireless local area network, as an example of the present disclosure, the step of establishing, by the mobile terminal, the wireless communication connection with the display device includes:

after the mobile terminal detects the display device through the wireless fidelity network, the mobile terminal establishes the wireless communication connection with the display device through the wireless fidelity network.

As an example, the specific manner of detecting the display device may be realized by detecting a router connected with both the display device and the mobile terminal. The specific process is not limited in the embodiment of the present disclosure.

In step 102, a gesture input interface corresponding to a current application of the display device is displayed.

After the mobile terminal establishes a wireless communication connection with the display device, the current application running in the display device may be informed to the mobile terminal, so that the mobile terminal may display the interface for inputting a gesture for the current application of the display device. The interface may include an interface prompt, such as a gesture operation table, to facilitate inputting of a user. The display device displays a main interface of the application, such as a screen of a game, a main interface of software. The mobile terminal may display or not display these interfaces.

In step 103, the mobile terminal detects a user gesture, converts the user gesture into an operation instruction corresponding to the user gesture and transmits the operation instruction to the display device.

According to an embodiment of the present disclosure, the mobile terminal transmits the operation instruction corresponding to the user gesture to the display device, so that the operation instruction may be executed by the current application of the display device.

The detection of the user gesture by the mobile terminal belongs to a process of gesture recognition. The essence of the gesture recognition as a three-dimensional input is to identify the intention of the user expressed by his own gestures. At present, there are many image classification algorithms for gesture recognition, such as a syntactic pattern recognition method, a template matching and table look-up method, a Bayesian classifier, a combined neural network. In view of pattern recognition, no matter which of a data glove and a camera is used for detecting inputted gesture, no matter what representation manner the gesture uses, no matter what feature extraction is used, the same method may be used for recognizing the gesture. The specific process for detecting the gesture is not limited in embodiments of the present disclosure. As shown in FIGS. 2A to 2F, gesture categories are tap, double tap, drag to right, swipe up, swipe down and two figure swipe down respectively. The above gestures may be detected by a touch screen. Different operation instructions correspond to different gesture categories, and the correspondence between the operation instructions and the gesture categories may be determined based on operation habits. For example, the tap corresponds to a selection instruction and the double tap corresponds to a confirmation instruction.

In this embodiment, the user gesture is detected and converted into a corresponding operation instruction by the mobile terminal having a gesture input function, then the operation instruction is transmitted to the display device through the wireless communication connection between the mobile terminal and the display device, and the display device operates based on the instruction. In this process, the display device does not need to have gesture detection capability, and the gesture detection capability is achieved by taking full advantage of the capabilities of existing device, and the user can hold the mobile terminal for inputting instead of standing in front of the display device, so that the hardware cost is relatively low and the inputting of gesture instruction is convenient.

As an example of the present disclosure, the mobile terminal has a touch input function. Where the mobile terminal detecting the user gesture includes the mobile terminal detecting a touch operation of the user. A display interface corresponding to the application is displayed by the mobile terminal, then the touch operation is obtained through the touch input function, the touch operation is converted into an operation instruction corresponding to the touch operation, and the operation instruction is transmitted to the display device.

Based on application needs, the display device is usually a large-screen display device, and the mobile terminal as an input device has relatively small screen. A split screen display may be utilized, an interface related to the input may not be displayed in the display device. Specifically, the gesture input interface is an input interface of the split screen interface of the application, and an operation result interface of the split screen interface of the application is displayed on the display device.

Figure 3:
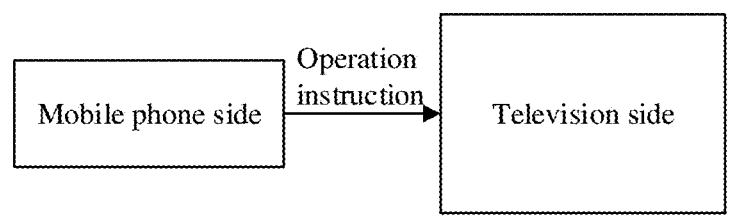
FIG. 3 is a schematic structural diagram of a system of an application scenario according to an embodiment of the present disclosure.

As a possible application scenario, the mobile terminal is a mobile phone, and the display device is a television. Other mobile terminals with gesture input functions and other devices capable of establishing a wireless connection with the mobile terminal are also possible, so it is not limited to the application scenarios of a mobile phone and a television. The television does not need to have a wireless communication capability, which may be in wireless communication connection with the mobile phone by establishing a local area network after connecting with a device such as a router with wire. FIG. 3 shows the application scenario according to the embodiment of the present disclosure. The system architecture of the application scenario includes a mobile phone side and a television side, where the mobile phone on the mobile phone side has a gesture detection function, and the television on the television side is mainly used for displaying and running a corresponding application. After establishing a communication connection between the mobile phone side and the television side, chess games are operated at television side by gesture function defined on the mobile phone side. The mobile phone is served as an operation controller of the game and the television is served as an instruction receiver and game screen displayer. A complete game experience is achieved by an interaction of the mobile phone and television. The specific process is described as follows.

Firstly, definition of various gesture functions is completed on the mobile phone side, the gestures include but not limited to tap, double tap, drag, swipe up, swipe down and two figure swipe down. The gestures of tap, double tap, drag, swipe up, swipe down and two figure swipe down correspond to operation instructions of starting a game, prompt, showing cards continuously, showing a card, cancelling a card selection, and no operation respectively. Secondly, a connection between the mobile phone side and the television side is established. Thirdly, split screen interactive interfaces (respectively, the mobile phone interface and television interface) of television chess game are displayed in the mobile phone side and the television side synchronously. Finally, game operations are completed by inputting different gestures corresponding the game operations at the mobile phone side.

Figure 4:
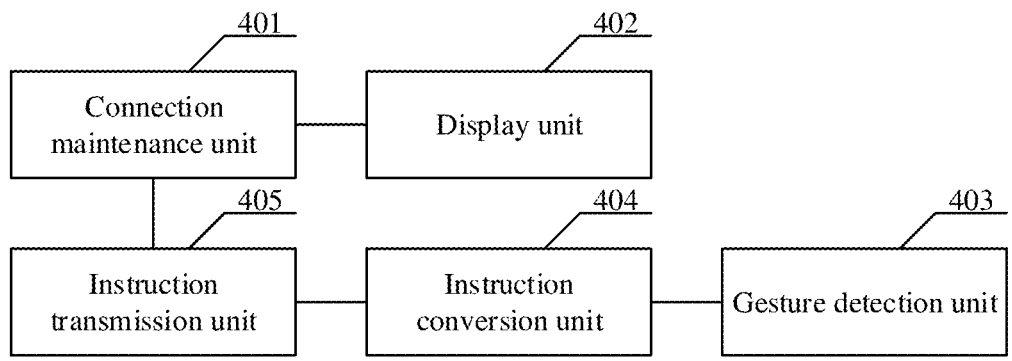
FIG. 4 is a schematic structural diagram of a gesture control device according to an embodiment of the present disclosure.

As shown in FIG. 4, a gesture control device (e.g. a mobile terminal) with a gesture input function is further provided according to an embodiment of the present disclosure, the gesture control device includes: a connection maintenance unit 401, a display unit 402, a gesture detection unit 403, an instruction conversion unit 404 and an instruction transmission unit 405. The connection maintenance unit 401 is configured to establish a wireless communication connection with a display device. The display unit 402 is configured to display a gesture input interface corresponding to a current application of the display device. The gesture detection unit 403 is configured to detect a user gesture. The instruction conversion unit 404 is configured to convert the user gesture into an operation instruction corresponding to the user gesture. The instruction transmission unit 405 is configured to transmit the operation instruction corresponding to the user gesture to the display device.

The mobile terminal may have a gesture input function. The mobile terminal may have corresponding hardware and/or software depending on a gesture input manner supported by the mobile terminal. The gesture input manner may be a touch gesture, or a floating gesture. For example, grammatical information of the gesture may be passed through a configuration and a movement change of a hand.

After the mobile terminal establishes a wireless communication connection with the display device, the current application running in the display device may be informed to the mobile terminal, so that the mobile terminal may display the interface for inputting a gesture for the current application of the display device. The interface may include an interface prompt, such as a gesture operation table, to facilitate inputting of a user. The display device displays a main interface of the application, such as a screen of a game, a main interface of software. The mobile terminal may display or not display these interfaces.

The detection of the user gesture by the mobile terminal belongs to a process of gesture recognition. The essence of the gesture recognition as a three-dimensional input is to identify the intention of the user expressed by his own gestures. At present, there are many image classification algorithms for gesture recognition, such as a syntactic pattern recognition method, a template matching and table look-up method, a Bayesian classifier, a combined neural network. In view of pattern recognition, no matter which of a data glove and a camera is used for detecting inputted gesture, no matter what representation manner the gesture uses, no matter what feature extraction is used, the same method may be used for recognizing the gesture. The specific process for detecting the gesture is not limited in embodiments of the present disclosure. As shown in FIGS. 2A to 2F, gesture categories are tap, double tap, drag to right, swipe up, swipe down and two figure swipe down respectively. The above gestures may be detected by a touch screen. Different operation instructions correspond to different gesture categories, and the correspondence between the operation instructions and the gesture categories may be determined based on operation habits. For example, the tap corresponds to a selection instruction and the double tap corresponds to a confirmation instruction.

In this embodiment, the user gesture is detected and converted into a corresponding operation instruction by the mobile terminal having a gesture input function, then the operation instruction is transmitted to the display device through the wireless communication connection between the mobile terminal and the display device, and the display device operates based on the instruction. In this process, the display device does not need to have gesture detection capability, and the gesture detection capability is achieved by taking full advantage of the capabilities of existing device, and the user can hold the mobile terminal for inputting instead of standing in front of the display device, so that the hardware cost is relatively low and the inputting of gesture instruction is convenient.

Based on the mobile communication capability of the mobile terminal, the mobile terminal may establish a connection with the display device using different communication manners, such as wireless local area network, point to point connection technology, more specifically, Bluetooth, wireless fidelity (WIFI). The communication manner may be selected based on the wireless communication capability of the mobile terminal and the display device. Based on the communication advantages of WIFI and a situation that most families use WIFI as the wireless local area network, as an example of the present disclosure, the connection maintenance unit 401 is configured to, after detecting the display device through the wireless fidelity network, establish the wireless communication connection with the display device through the wireless fidelity network.

As an example, the specific manner of detecting the display device may be realized by detecting a router connected with both the display device and the mobile terminal. The specific process is not limited in the embodiment of the present disclosure.

Figure 5:
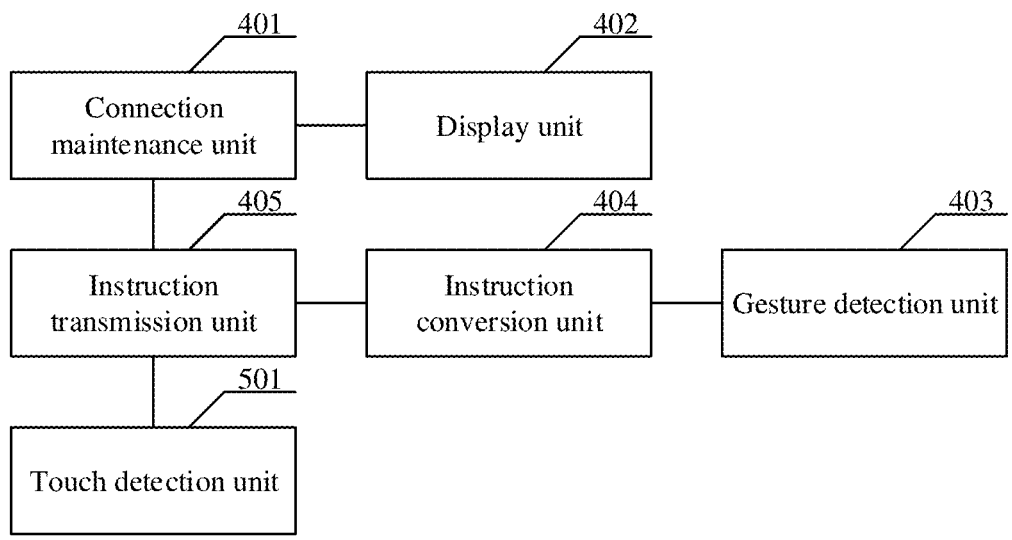
FIG. 5 is a schematic structural diagram of a gesture control device according to another embodiment of the present disclosure.

As an example of the present disclosure, as shown in FIG. 5, the mobile terminal has a touch input function. The display unit 402 is further configured to display a display interface corresponding to the application after establishing a wireless communication connection with the display device. The mobile terminal also includes: a touch detection unit 501, configured to detect a touch operation of a user. The instruction conversion unit 404 is further configured to convert the touch operation into an operation instruction corresponding to the touch operation. The instruction transmission unit 405 is further configured to transmit the operation instruction corresponding to the touch operation to the display device.

Based on application needs, the display device is usually a large-screen display device, and the mobile terminal as an input device has relatively small screen. A split screen display may be utilized, an interface related to the input may not be displayed in the display device. Specifically, the gesture input interface is an input interface of the split screen interface of the application, and an operation result interface of the split screen interface of the application is displayed on the display device.

As a possible application scenario, the mobile terminal is a mobile phone, and the display device is a television. Other mobile terminals with gesture input functions and other devices capable of establishing a wireless connection with the mobile terminal are also possible, so it is not limited to the application scenarios of a mobile phone and a television. The television does not need to have a wireless communication capability, which may be in wireless communication connection with the mobile phone by establishing a local area network after connecting with a device such as a router with wire.

Figure 6:
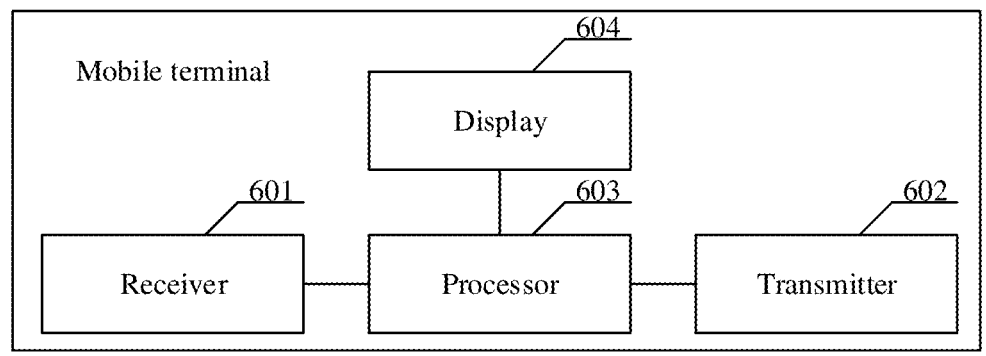
FIG. 6 is a schematic structural diagram of a gesture control device according to another embodiment of the present disclosure.

As shown in FIG. 6, another gesture control device (e.g. a mobile terminal) is provided according to the embodiment of the present disclosure, which includes a receiver 601, a transmitter 602, a processor 603 and a display 604. The gesture control device may also include a memory which is not shown in FIG. 6. The processor 603 shown in FIG. 6 is configured to control to implement functions implemented by the units shown in FIG. 5.

The processor 603 is configured to control to execute following operations: establishing a wireless communication connection with a display device; displaying a gesture input interface corresponding to a current application of the display device; detecting a user gesture, converting the user gesture into an operation instruction corresponding to the user gesture, and transmitting the operation instruction to the display device.

The mobile terminal may have a gesture input function. The mobile terminal may have corresponding hardware and/or software depending on a gesture input manner supported by the mobile terminal. The gesture input manner may be a touch gesture, or a floating gesture. For example, grammatical information of the gesture may be passed through a configuration and a movement change of a hand.

After the mobile terminal establishes a wireless communication connection with the display device, the current application running in the display device may be informed to the mobile terminal, so that the mobile terminal may display the interface for inputting a gesture for the current application of the display device. The interface may include an interface prompt, such as a gesture operation table, to facilitate inputting of a user. The display device displays a main interface of the application, such as a screen of a game, a main interface of software. The mobile terminal may display or not display these interfaces.

The detection of the user gesture by the mobile terminal belongs to a process of gesture recognition. The essence of the gesture recognition as a three-dimensional input is to identify the intention of the user expressed by his own gestures. At present, there are many image classification algorithms for gesture recognition, such as a syntactic pattern recognition method, a template matching and table look-up method, a Bayesian classifier, a combined neural network. In view of pattern recognition, no matter which of a data glove and a camera is used for detecting inputted gesture, no matter what representation manner the gesture uses, no matter what feature extraction is used, the same method may be used for recognizing the gesture. The specific process for detecting the gesture is not limited in embodiments of the present disclosure. As shown in FIGS. 2A to 2F, gesture categories are tap, double tap, drag to right, swipe up, swipe down and two figure swipe down respectively. The above gestures may be detected by a touch screen. Different operation instructions correspond to different gesture categories, and the correspondence between the operation instructions and the gesture categories may be determined based on operation habits. For example, the tap corresponds to a selection instruction and the double tap corresponds to a confirmation instruction.

In this embodiment, the user gesture is detected and converted into a corresponding operation instruction by the mobile terminal having a gesture input function, then the operation instruction is transmitted to the display device through the wireless communication connection between the mobile terminal and the display device, and the display device operates based on the instruction. In this process, the display device does not need to have gesture detection capability, and the gesture detection capability is achieved by taking full advantage of the capabilities of existing device, and the user can hold the mobile terminal for inputting instead of standing in front of the display device, so that the hardware cost is relatively low and the inputting of gesture instruction is convenient.

Based on the mobile communication capability of the mobile terminal, the mobile terminal may establish a connection with the display device using different communication manners, such as wireless local area network, point to point connection technology, more specifically, Bluetooth, wireless fidelity (WIFI). The communication manner may be selected based on the wireless communication capability of the mobile terminal and the display device. Based on the communication advantages of WIFI and a situation that most families use WIFI as the wireless local area network, as an example of the present disclosure, the processor 603 is configured to control to perform the following operation: establishing the wireless communication connection with the display device includes: after the mobile terminal detects the display device through the wireless fidelity network, establishing the wireless communication connection with the display device through the wireless fidelity network.

As an embodiment of the present disclosure, the mobile terminal has a touch input function, the processor 603 is configured to control to perform the following operation: after establishing a wireless communication connection with the display device, displaying a display interface corresponding to the application; detecting a touch operation of a user, converting the touch operation into an operation instruction corresponding to the touch operation, and transmitting the operation instruction to the display device.

Based on application needs, the display device is usually a large-screen display device, and the mobile terminal as an input device has relatively small screen. A split screen display may be utilized, an interface related to the input may not be displayed in the display device. Specifically, the gesture input interface is an input interface of the split screen interface of the application, and an operation result interface of the split screen interface of the application is displayed on the display device.

As a possible application scenario, the mobile terminal is a mobile phone, and the display device is a television. Other mobile terminals with gesture input functions and other devices capable of establishing a wireless connection with the mobile terminal are also possible, so it is not limited to the application scenarios of a mobile phone and a television. The television does not need to have a wireless communication capability, which may be in wireless communication connection with the mobile phone by establishing a local area network after connecting with a device such as a router with wire.

Figure 7:
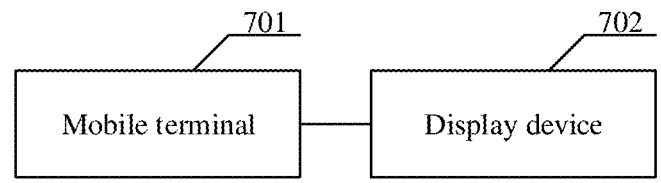
FIG. 7 is a schematic structure diagram of a gesture control system according to an embodiment of the present disclosure.

As shown in FIG. 7, a gesture control system is provided according to an embodiment of the present disclosure, the gesture control system includes a mobile terminal 701 and a display device 702. Where the mobile terminal 701 is any one of the mobile terminals according to embodiments of the present disclosure.

In this embodiment, the user gesture is detected and converted into a corresponding operation instruction by the mobile terminal having a gesture input function, then the operation instruction is transmitted to the display device through the wireless communication connection between the mobile terminal and the display device, and the display device operates based on the instruction. In this process, the display device does not need to have gesture detection capability, and the gesture detection capability is achieved by taking full advantage of the capabilities of existing device, and the user can hold the mobile terminal for inputting instead of standing in front of the display device, so that the hardware cost is relatively low and the inputting of gesture instruction is convenient.

Figure 8:
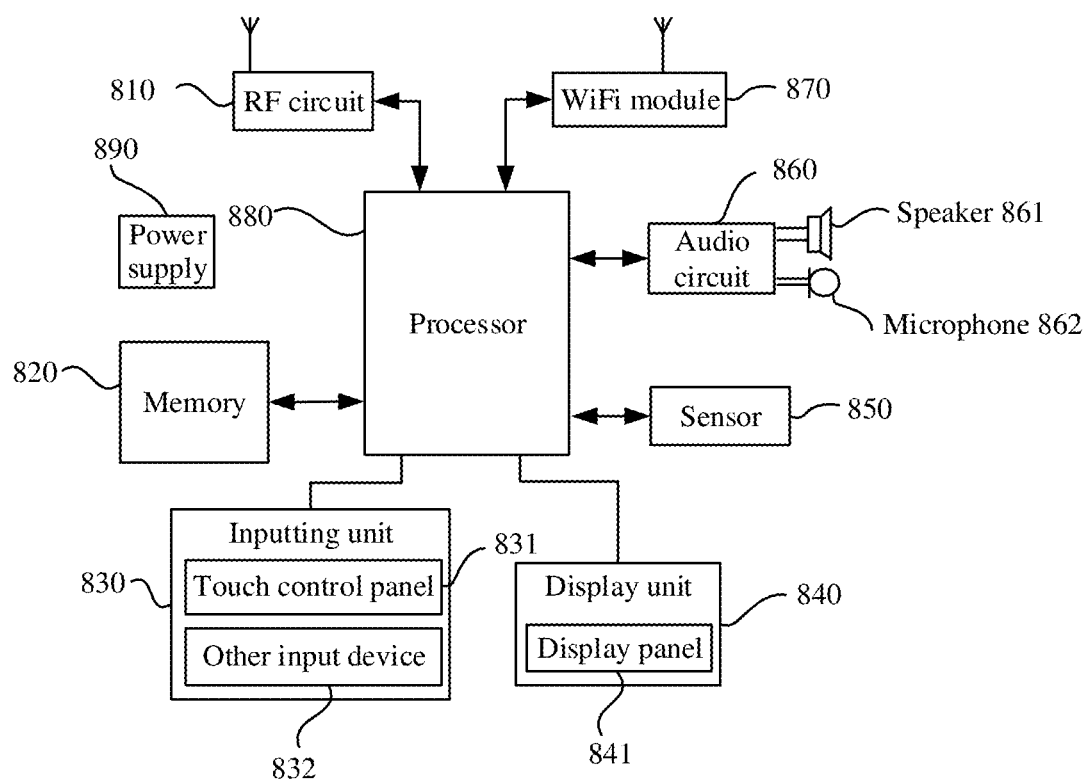
FIG. 8 is a schematic structure diagram of a mobile terminal according to an embodiment of the present disclosure.

Another mobile terminal is provided according to an embodiment of the present disclosure. As shown in FIG. 8, a mobile phone is taken as an example. For a convenience of explanation, only the parts related to the embodiment of the present disclosure are shown. For details which are not illustrated, reference is made to the method part of the present disclosure. The terminal device may be any one of a mobile phone, a tablet PC, a PDA (Personal Digital Assistant), and a mobile phone as the terminal device is taken as an example.

FIG. 8 is a block diagram showing a part of the structure of a mobile phone related to the terminal device according to the embodiment of the present disclosure. Referring to FIG. 8, the mobile phone includes a radio frequency (RF) circuit 810, a memory 820, an inputting unit 830, a display unit 840, a sensor 850, an audio circuit 860, a wireless fidelity (WiFi) module 870, a processor 880 and a power supply 890, etc. It should be appreciated by those skilled in the art that the mobile phone structure shown in FIG. 8 does not constitute a limitation to the mobile phone, the mobile phone may include more or fewer components than the components shown in FIG. 8, or may combine certain components, or may be in a different component arrangement.

Each of the components of the mobile phone is described in detail in conjunction with FIG. 8.

The RF circuit 810 may be configured to receive and send a signal during a process of receiving and sending information or a process of making a call. Specifically, after downlink information from a base station is received, the downlink information is processed in the processor 880, and uplink data from the mobile phone are sent to the base station. Generally, the RF circuit 810 includes but is not limited to an antenna, at least one amplifier, a transceiver, a coupler, a Low Noise Amplifier (LNA), and a duplexer. In addition, the RF circuit 810 may communicate with other devices and network via wireless communication. The wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, and Short Messaging Service (SMS).

The memory 820 may be configured to store software programs and modules, and the processor 880 may execute various function applications and data processing of the mobile phone by running the software programs and modules stored in the memory 820. The memory 820 may mainly include a program storage area and a data storage area. The program storage area may be used to store an operating system and an application required by at least one function (for example, a voice playing function, an image playing function). The data storage area may be used to store data (for example, audio data, telephone book) established based on the use of the mobile phone. In addition, the memory 820 may include a high-speed random access memory and a nonvolatile memory, such as at least one magnetic disk memory, a flash memory, or other volatile solid-state memory.

The inputting unit 830 may be configured to receive an inputted number or character information, and generate key signal input related to user setting and function controlling of the mobile phone. Specifically, the inputting unit 830 may include a touch control panel 831 and other input device 832. The touch control panel 831, also referred to as a touch screen, may collect a touch operation performed by the user on the touch screen or near the touch screen (for example, an operation on or near the touch control panel 831 that is made by a user with a finger, a touch pen and any other suitable object or accessory), and drive corresponding connection devices based on a pre-set procedure. Optionally, the touch control panel 831 may include a touch detection device and a touch controller. The touch detection device detects touch orientation of a user, detects a signal generated by the touch operation, and transmits the signal to the touch controller. The touch controller receives touch information from the touch detection device, converts the touch information into touch point coordinates and transmits the touch point coordinates to the processor 880. The touch controller also can receive a command from the processor 880 and execute the command. In addition, the touch control panel 831 may be implemented as a resistive panel, a capacitive panel, an infrared panel and a surface acoustic wave panel or the like. In addition to the touch control panel 831, the inputting unit 830 may also include other input device 832. Specifically, the other inputting device 832 may include, but is not limited to, one or more of a physical keyboard, a function button (such as a volume controlling button or a switch button), a trackball, a mouse, an operating rod and so on.

The display unit 840 may be configured to display information inputted by the user or provided for the user, and various menus of the mobile phone. The display unit 840 may include a display panel 841. Optionally, the display panel 841 may be configured in a form of Liquid Crystal Display (LCD), or Organic Light-Emitting Diode (OLED) and so on. In addition, the display panel 841 may be covered by the touch control panel 831. When the touch control panel 831 detects a touch operation on or near the touch control panel 831, the touch control panel 831 transmits the touch operation to the processor 880 to determine the type of the touch event, and then the processor 880 provides a corresponding visual output on the display panel 841 based on the type of the touch event. Although the touch control panel 831 and the display panel 841 implement the input and output functions of the mobile phone as two separate components in FIG. 8, the touch control panel 831 and the display panel 841 may be integrated together to implement the input and output functions of the mobile phone in other embodiment.

The mobile phone may further include at least one sensor 850, such as a light sensor, a motion sensor and other sensor. Specifically, the light sensor may include an ambient light sensor and a proximity sensor, the ambient light sensor may adjust brightness of the display panel 841 based on brightness of ambient light, and the proximity sensor may close the display panel 841 and/or backlight in a case that the mobile phone moves to an ear. As one of motion sensors, an acceleration sensor may detect magnitude of an accelerated rate in each of directions (there are usually three axes), the acceleration sensor may detect magnitude and a direction of gravity while the acceleration sensor at rest, and the acceleration sensor be applied to an application for recognizing a gesture of the mobile phone (such as switching between portrait and landscape orientation, a related game, or gesture calibration using a magnetometer) and applied to a function related to vibration recognition (such as a pedometer or a click). Other sensors, such as a gyroscope, a barometer, a hygrometer, a thermometer or an infrared sensor, may be provided for the mobile phone, which are not described herein.

An audio circuit 860, a speaker 861 and a microphone 862 may provide an audio interface between the user and the mobile phone. The audio circuit 860 may send an electrical signal, converted from received audio data to the speaker 861, and then the speaker 861 converts the electrical signal into an audio signal for outputting. On the other hand, the microphone 862 converts a collected audio signal to an electrical signal, the electrical signal is received by the audio circuit 860 and then converted into audio data, and after the audio data is processed by the processor 880, the processed audio data is sent to another mobile phone via the RF circuit 810, or the audio data is outputted to the memory 820 for further processing.

WiFi belongs to a short-distance wireless transmission technology, the mobile phone may help the user receive and send emails, browse a webpage, and access to streaming media, with the WiFi module 870, and the WiFi module 870 provides wireless broadband internet access for the user. Although the WiFi module 870 is illustrated in FIG. 8, it can be understood that, the WiFi module 870 is not a necessary constituent of the mobile phone, and may be omitted based on requirements without changing essence of the present disclosure.

The processor 880 is a control center of the mobile phone, which connects each part of the mobile phone with interfaces and circuits, and performs the functions of the mobile phone and the data processing by running or executing the software programs and/or modules stored in the memory 820 and calling data stored in the memory 820, thereby realizing overall monitoring of the mobile phone. Optionally, the processor 880 may include one or more processing units. Preferably, the processor 880 may integer an application processor and a modem processor, the application processor is mainly configured to process operating systems, user interfaces and applications. The modem processor is mainly configured to process wireless communications. It can be understood that the modem processor may not be integrated into the processor 880.

The mobile phone further includes the power supply 890 (such as a battery) configured to power all the components, Preferably, the power supply may be logically connected with the processor 880 via a power supply management system, so that management of functions, such as charging, discharging and power managing, can be realized with the power supply management system.

Not shown in the figure, however, the mobile phone may further include a camera, a Bluetooth module, and so on, which is not described here.

In the embodiment of the present disclosure, the processor 880 included in the terminal device also has a function of controlling the execution of the above method.

It should be noted that each unit included in the embodiment of the mobile terminal is divided according to its functional logic, but the division is not limited as long as the corresponding functions can be realized. In addition, the special names of the unit are for a purpose of distinguishing from each other, which are not intended to limit the protection scope of the present disclosure.

In addition, it will be appreciated by those skilled in the art that all or a part of the steps in the method embodiments described above may be accomplished by related hardware which is instructed by programs. The programs may be stored in a computer-readable storage medium, which may be a read-only memory, a magnetic disk, an optical disk or the like.

The above descriptions are only preferred embodiments of the present disclosure and are not to limit the present disclosure. Any changes and equivalents which can be made by those skilled in the art within the technical scope of the

The invention claimed is:

1. A gesture control method, comprising:
   establishing, by a mobile terminal, a wireless communication connection with a display device;
   running, by the display device, a current application in a split screen interface, the split screen interface of the current application including a gesture input interface displayed on the mobile terminal and a device interface displayed on the display device, wherein the display device displays the device interface that is not displayed on the mobile terminal, and wherein the mobile terminal displays the gesture input interface that is not displayed on the display device and wherein the current application includes a chess game providing a game screen that is displayed by the display device and controlled by the gesture input interface;
   displaying, by the mobile terminal, the gesture input interface corresponding to the current application of the display device;
   defining, by a user on the mobile terminal, a one-to-one correspondence between a plurality of operation instructions directed to the display device and a plurality of user gestures directed to the mobile terminal in advance, wherein the plurality of user gestures includes a plurality of different swipe gestures, the plurality of operation instructions including a first operation instruction to show a game card, a second operation instruction to show a plurality of game cards continuously and a third operation instruction to cancel selection of a game card, wherein the first, second and third operation instructions correspond to and are generated by different ones of the plurality of swipe gestures, wherein a gaming instruction is generated in response to a swipe gesture of the plurality of swipe gestures, and the gaming instruction includes at least one of the first, second and third operation instructions and wherein the generated gaining instruction causes the display device to show a game card, show a plurality of game cards continuously or cancel selection of a game card;
   receiving, by the mobile terminal, the gaining instruction for operating the chess game;
   displaying, on the gesture input interface, an interface prompt including a gesture operation table that facilitates input of a user gesture of the plurality of user gestures from the user;
   detecting, by the mobile terminal, the user gesture;
   converting, by the mobile terminal, the user gesture into one of the plurality of operation instructions corresponding to the user gesture;
   transmitting, by the mobile terminal, the one of the operation instructions to the display device;
   operating the chess game running on the display device based on the one of the plurality of operation instructions; and
   causing display of a visual output on the display device based on the one of the operation instructions.

2. The gesture control method according to claim 1, wherein the establishing, by the mobile terminal, the wireless communication connection with the display device comprises:
   establishing, by the mobile terminal, the wireless communication connection with the display device through a wireless fidelity network after the mobile terminal detects the display device by detecting one router connected with both the display device and the mobile terminal.

3. The gesture control method according to claim 1, wherein the mobile terminal has a touch input function, and wherein the detecting, by the mobile terminal, the user gesture comprises: detecting, by the mobile terminal, a touch operation of a user.

4. The gesture control method according to claim 3, wherein the converting, by the mobile terminal, the user gesture comprises:
   converting, by the mobile terminal, the touch operation into an operation instruction corresponding to the touch operation.

5. A gesture control device, comprising a processor and a memory for storing program instructions, wherein the processor executes the program instructions to:
   establish a wireless communication connection with a display device;
   display a gesture input interface corresponding to a current application of the display device, wherein the gesture input interface is part of a split screen interface and the display device runs the current application in the split screen interface, the split screen interface of the current application including a gesture input interface displayed on the gesture control device and a device interface displayed on the display device, wherein the display device displays the device interface that is not displayed on the gesture control device and wherein the gesture control device displays the gesture input interface that is not displayed on the display device and wherein the current application includes a chess game providing a game screen that is displayed by the display device and controlled by the gesture input interface;
   define, by a user on the gesture control device, a one-to-one correspondence between a plurality of operation instructions directed to the display device and a plurality of user gestures directed to the gesture control device in advance, wherein the plurality of user gestures includes a plurality of different swipe gestures, the plurality of operation instructions including a first operation instruction to show a game card, a second operation instruction to show a plurality of game cards continuously and a third operation instruction to cancel selection of a game card, wherein the first, second and third operation instructions correspond to and are generated by different ones of the plurality of swipe gestures, wherein a gaming instruction is generated in response to a swipe gesture of the plurality of swipe gestures, and the gaming instruction includes at least one of the first, second and third operation instructions and wherein the generated gaining instruction causes the display device to show a game card, show a plurality of game cards continuously or cancel selection of a game card;
   receive, by the gesture control device, the gaining instruction for operating the chess game;
   display, on the gesture input interface, an interface prompt including a gesture operation table that facilitates input of a user gesture of the plurality of user gestures from the user;
   detect the user gesture;

convert the user gesture into one of the plurality of operation instructions corresponding to the user gesture;

transmit the one of the operation instructions to the display device;

operate the chess game running on the display device based on the one of the plurality of operation instructions; and cause display of a visual output on the display device based on the one of the operation instructions.

6. The gesture control device according to claim 5, wherein the processor executes the program instructions further to establish the wireless communication connection with the display device through a wireless fidelity network after the gesture control device detects the display device by detecting one router connected with both the display device and the gesture control device.

7. The gesture control device according to claim 5, wherein the gesture control device has a touch input function.

8. The gesture control device according to claim 7, wherein the processor executes the program instructions further to detect a touch operation of a user.

9. The gesture control device according to claim 8, wherein the processor executes the program instructions further to convert the touch operation into an operation instruction corresponding to the touch operation.

10. A non-transitory computer readable storage medium comprising program instructions that configure a computing device to perform a gesture control method, wherein the gesture control method comprises:

establishing, by a mobile terminal, a wireless communication connection with a display device;

running, by the display device, a current application in a split screen interface, the split screen interface of the current application including a gesture input interface displayed on the mobile terminal and a device interface displayed on the display device, wherein the display device displays the device interface that is not displayed on the mobile terminal, and wherein the mobile terminal displays the gesture input interface that is not displayed on the display device and wherein the current application includes a chess game providing a game screen that is displayed by the display device and controlled by the gesture input interface;

displaying, by the mobile terminal, the gesture input interface corresponding to the current application of the display device;

defining, by a user on the mobile terminal, a one-to-one correspondence between a plurality of operation instructions directed to the display device and a plurality of user gestures directed to the mobile terminal in advance, wherein the plurality of user gestures includes a plurality of different swipe gestures, the plurality of operation instructions including a first operation instruction to show a game card, a second operation instruction to show a plurality of game cards continuously and a third operation instruction to cancel selection of a game card, wherein the first, second and third operation instructions correspond to and are generated by different ones of the plurality of swipe gestures, wherein a gaming instruction is generated in response to a swipe gesture of the plurality of swipe gestures, and the gaming instruction includes at least one of the first, second and third operation instructions and wherein the generated gaming instruction causes the display device to show a game card, show a plurality of game cards continuously or cancel selection of a game card;

receiving, by the mobile terminal, the gaming instruction for operating the chess game;

displaying, on the gesture input interface, an interface prompt including a gesture operation table that facilitates input of a user gesture of the plurality of user gestures from the user;

detecting, by the mobile terminal, the user gesture;

converting, by the mobile terminal, the user gesture into one of the plurality of operation instructions corresponding to the user gesture;

transmitting, by the mobile terminal, the one of the operation instructions to the display device;

operating the chess game running on the display device based on the one of the plurality of operation instructions; and causing display of a visual output on the display device based on the one of the operation instructions.

11. The non-transitory computer readable storage medium according to claim 10, wherein the establishing, by the mobile terminal, the wireless communication connection with the display device comprises:

establishing, by the mobile terminal, the wireless communication connection with the display device through a wireless fidelity network after the mobile terminal detects the display device by detecting one router connected with both the display device and the mobile terminal.

12. The non-transitory computer readable storage medium according to claim 10, wherein the mobile terminal has a touch input function.

13. The non-transitory computer readable storage medium according to claim 12, wherein the detecting, by the mobile terminal, the user gesture comprises: detecting, by the mobile terminal, a touch operation of a user.

14. The non-transitory computer readable storage medium according to claim 13, wherein the converting, by the mobile terminal, the user gesture comprises:

converting, by the mobile terminal, the touch operation into an operation instruction corresponding to the touch operation.

* * * * *